United States Patent [19]

Dixon et al.

[11] 3,755,786

[45] Aug. 28, 1973

[54] SERIAL LOOP DATA TRANSMISSION SYSTEM

[75] Inventors: Roy C. Dixon; Larry J. Hash; James D. Markov; Lynn P. West, all of Raleigh, N.C.

[73] Assignee: International Business Machines Corporation, Armonk, N.Y.

[22] Filed: Apr. 27, 1972

[21] Appl. No.: 248,283

[52] U.S. Cl. .......................... 340/172.5, 179/15 AL

[51] Int. Cl. .............................................. H04j 3/00

[58] Field of Search ................................. 340/172.5; 179/15 AL

[56] References Cited

UNITED STATES PATENTS

| | | | |
|---|---|---|---|
| 3,483,329 | 12/1969 | Hunkins et al. | 179/15 |
| 3,519,750 | 7/1970 | Beresin et al. | 179/15 |
| 3,529,089 | 9/1970 | Davis et al. | 179/15 |
| 3,632,881 | 1/1972 | Graham | 179/15 |
| 3,633,169 | 1/1972 | Bickford | 340/172.5 |
| 3,639,904 | 2/1972 | Arulpragasam | 340/147 R |
| 3,680,056 | 7/1972 | Kropfl | 340/172.5 |

*Primary Examiner*—Paul J. Henon
*Assistant Examiner*—James D. Thomas
*Attorney*—John B. Frisone et al.

[57] ABSTRACT

Bidirectionally communicating terminals are connected to a serial loop by interfaces which provide no delay. Communications are effected in fixed length time slots which include an indicia of the state of the slot. Slots carrying data to a terminal have the state indicia set to value which indicates that the slot is in use. At the receiving terminal, the indicia is retained in the state if the terminal is to use the slot for transmitting data. If the receiving terminal has no data to send, the state indicia is reset to a different value. In the reset state, the slot is available to subsequent terminals for the transmission of data.

5 Claims, 7 Drawing Figures

SERIAL LOOP DATA TRANSMISSION SYSTEM

BACKGROUND OF THE INVENTION

1. Field of the Invention

The invention relates to serial loop data transmission systems and more particularly to loop transmission systems utilizing a plurality of sequential fixed length time slots in which the time slots are assigned for transmission of data to a terminal connected to the loop and released by a recipient terminal and made available for the transmission of data from subsequent terminals connected to the loop.

2. Description of the Prior Art

It is a common practice in serial loop data transmission systems to utilize fixed length time slots for transmitting data from and to a plurality of terminals connected to the loop. Each terminal may be provided with a permanently assigned slot or alternatively a number of slots less than the total number of terminals may be temporarily assigned to those terminals requiring service at any given time. The terminals receive data from a central control station via the assigned slot and transmit data to the center station via the assigned slot or a free slot provided by the central station on an as available basis. If a terminal is in the process of receiving data and has no data to send, the transmission capacity represented by the slot is wasted since the terminals subsequent to the recipient terminal have no way of determining the availability of the slot. This is not a serious drawback with a wide band transmission medium if the channel capacity exceed the communications requirements.

However, when narrow band channels are utilized, the loss of this capacity may become critical. Under these circumstances, recovery and use of this capacity is essential to economic operation. In those instances where sufficient delay is provided at the terminal interface with the loop, the solution to the problem is readily effected by causing the recipient terminal to alter the indicia associated with the channel to indicate the availability of the channel. Thus, subsequent terminals will be aware of the availability of the channel. However, in those systems where no delay or insufficient delay for effecting an indicia change is available, the solution is not readily effected.

SUMMARY OF THE INVENTION

The invention contemplates a new technique including novel structures for efficiently operating a serial loop transmission system in which the terminal interfaces are provided with no delay or insufficient delay to permit alteration of indicia associated with a fixed length time slot which indicates the availability or nonavailability of the time slot. According to the technique, each of the time slots is provided with two address locations separated by status indicia; a slot containing a message for a particular terminal will include the terminal address in the first address location and the status indicia will be set to indicate that the slot is being used. Upon detection of the address at the concerned terminal, the status indicia which follows is changed to indicate that the slot is available if the terminal addressed does not have data to transmit. A subsequent terminal having data to transmit examines the status indicia and changes the indicia to indicate the slot is in use and identifies itself by inserting its address in the second address location. The data to be transmitted occupies the remainder of the slot.

One object of the invention is to increase the efficiency of utilization of serial loop data communications systems.

Another object of the invention is to provide a serial loop data transmission system in which time slots used for transmitting data to a terminal connected to the loop are released for use by terminals down stream from the recipient terminal.

A further object of the invention is to provide efficient utilization of transmission capacity in a serial loop data transmission system in which the terminal interfaces to the loop are provided with no delay or insufficient delay to recognize and change indicia indicative of time slot status or terminal addresses.

The foregoing and other objects, features and advantages of the invention will be apparent from the following more particular description of preferred embodiments as illustrated in the accompaying drawings.

DESCRIPTION OF THE PREFERRED EMBODIMENTS

Figure 1:
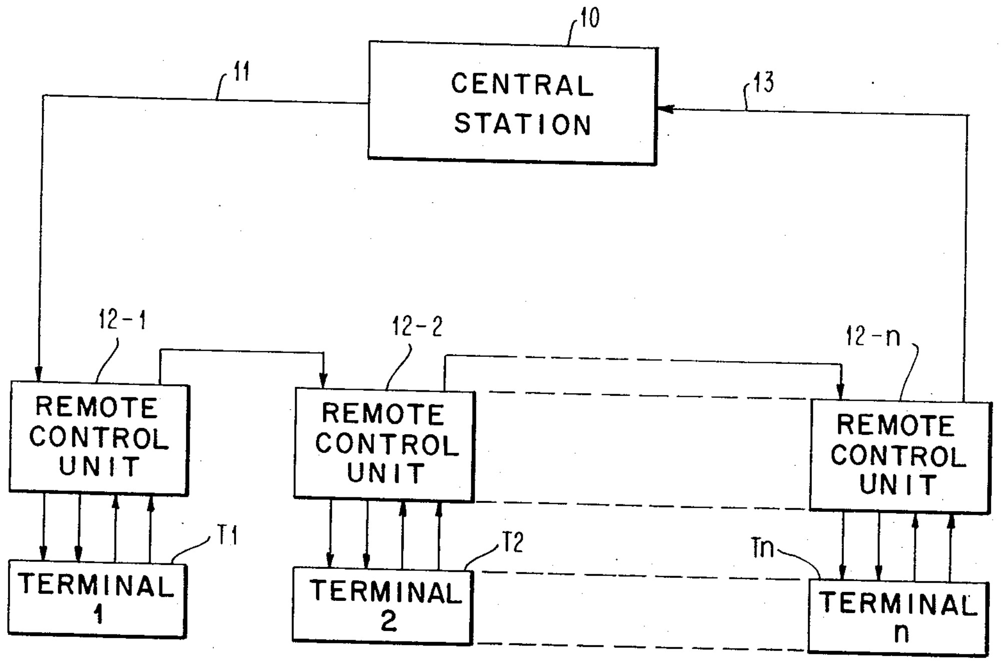
FIG. 1 is a block diagram illustrating a complete serial loop data transmission system.

FIG. 1 is a block diagram of a serial loop data transmission system and includes a central station 10 having an output 11 connected to one input of a first remote control unit 12–1. The output of remote control unit 12–1 is connected to the input of a second remote control unit 12–2. The output of the second remote control unit is connected via intervening remote control units not illustrated in the figure to the input of the last remote control unit **12–*n*. The output of remote control unit 12–*n* is connected to an input 13 of the central station 10**. Each of the remote control units is connected to a terminal T1–T*n*, respectively via a plurality of conductors. Terminals T may take a number of different forms and may be constructed to provide the function of the terminals disclosed in U.S. Pat. 3,469,243 issued to F. P. Willcox et al., Sept. 23, 1969. One of the conductors conveys data addressed to the respective terminal from the loop. Another conductor conveys data, which includes the terminal address and information, originating in the terminal to the loop via the remote control unit. The third conductor conveys control signals from the remote control unit to the associated terminal and the fourth conductor conveys control signals from the terminal to its associated remote control unit.

Data from the central station for one of the terminals is transmitted via the output line 11. It will pass through the remote control units associated with intervening terminals. When it arrives at the remote control unit associated with the recipient terminal, the remote control unit will switch the data to the terminal and at the same time will take an action which will permit one of the terminals connected to the remote control units further downstream in the direction of flow of data to seize the available communications link for transmitting messages to the central station input 13 while the recipient terminal is receiving the message from the central station. The remote control units are not provided with delay means in the loop and therefore cannot examine more than one bit of information received before passing the information on. Decisions must be made at specific times in the receipt of data; however, until the decision can be made, the bits previously received must be transferred to the subsequent remote control unit since a decision sometimes may only be made on the last bit of a multibit pattern of bits. The elimination of transmission delay at the remote control units is highly desirable since it reduces substantially the response time of the communications system. A reduction of response time in an interactive terminal oriented communications system improves the efficiency of the system and of the terminal operators.

Figure 4:
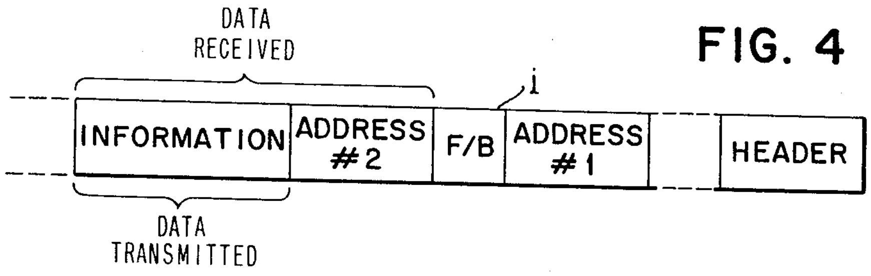
FIG. 4 is a graphical representation of a time slot used in systems such as those illustrated in FIG. 2.
Figure 5:
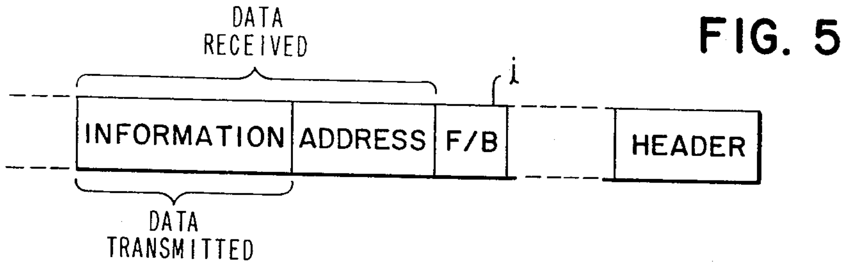
FIG. 5 is a graphical representation of a time slot used in systems such as those illustrated in FIG. 3.

As stated above, the system contemplates usage under two operating conditions. One of the conditions is where a time slot is provided for each terminal connected to the system. Thus, if *n* terminals are connected in series on the loop, *n* time slots are provided and repeat consecutively. However, a system can be configured in which fewer time slots than the total number of terminals are provided which repeat consecutively. These time slots are assigned for specific periods of time. For example, each time a data message or portion thereof is to be transmitted to a given terminal, that terminal's address will be inserted within the time slot followed by the data to be transmitted to the terminal. The remote control unit upon recognizing the terminal address associated with it will then switch the data portion of the message within the time slot to the terminal and free the time slot so that downstream terminals can utilize its capacity for transmitting messages back to the central station. Upon a subsequent message or portion thereof for that terminal, another time slot within the sequence of time slots may be selected simply by inserting the recipient terminal address in the time slot. FIGS. 4 and 5 illustrate the formatting of the time slots for the two situations set forth above.

The graphical illustration in FIG. 4 depicts the time slot configuration for a system in which there are fewer time slots than terminals connected to the loop and each time slot must include the address of a recipient terminal in order that the data contained within the time slot will be received by that terminal. The time slots will be substantially fewer in number than the number of terminals and will be preceded by a header section. The ith time slot in the group of time slots has been illustrated. This time slot will include a first area which will contain a fixed number of bits which are sufficient in number to provide a unique combination of bits for each of the terminals connected to the communications network. A second portion labeled F/B is a single bit of information which indicates when in one state that the slot is busy and in its other state that the slot is free. A third section contains a second address field similar to the first field set forth above and the final section is reserved for messages or information.

When data is being transmitted from the central station to the terminal, the information may be inserted in the second address field; however, when a terminal transmits data to the central station, the information field is limited to the size illustrated in the drawing since the second address field must contain the address of the sending terminal. The single exception to the above is in the case where a receiving terminal simultaneously transmits to the central station via the receiving slot. In that case, the terminal address is included in the first address field and thus identifies the transmitting terminal. It is believed however that this added efficiency in this single instance is of dubious value and error detection and reliability would be enhanced by duplicating the terminal's address in the second address field. This duplication would indicate an intentional use of the slot by the recipient terminal and would indicate proper operation of the terminal equipment.

It is obvious that by the time the terminal recognizes its address; that is, upon receipt of the last serial bit of the first address field, the terminal can no longer change the address field. However, at this time having recognized its address, it may free the slot for further use downstream by transmitting a free state in the status portion of the slot. That is, in that portion illustrated and labeled F/B. Thus, a downstream terminal seeing the status in the free state could commence transmission by changing the status to busy and inserting its address in the second address field and the information or data in the information portion. If the receiving terminal upon recognizing its address in the first address field has data to send, it would not change the status of the slot, it would leave it in the busy status, insert its address in the second address field while it was receiving the data contained therein and insert information to be transmitted to the central station in the portion of the slot occupied by the previously received information.

In those systems in which each of the terminals is provided with its own unique slot for receiving information, the address information contained in the first address field illustrated in FIG. 4 is not necessary since addressing is implicit in the slot position assigned to the terminal. Thus, in FIG. 5, the slots following the header include only the status portion F/B, an address field for inserting the address of a sending terminal and an information field. Each terminal detects the header portion and counts slots until it knows that it is receiving an assigned slot. At this time, if it has no data to transmit, it releases the slot by changing the status from busy to free. A subsequent terminal upon seeing a free slot may insert its address after it changes the status from free to busy and its data in the remainder of the slot. Except for the fact that the first address field is not needed since it is defined by the position following the header section, the two techniques are substantially identical; however, the implementation of each differs. The differences will be obvious as FIGS. 2 and 3 are described.

The implementations described herein will assume the use of a binary signalling system in which the values one and zero in combinations are used to encode information. The binary one and zero values will be communicated by electrical signals having first and second manifestations, respectively. These manifestations are detected and decoded in a conventional manner as is well known in the art. The header signal illustrated in FIGS. 4 and 5 may be a unique combination of bits which identifies the beginning of a group of slots. In the case of FIG. 4, these will be a fixed number of slots fewer than the number of terminals connected to the loop. The first slot will be positioned immediately following the header and the remaining slots will be positioned in sequence on a time scale. In the case of FIG. 5, the number of slots will equal the number of terminals connected to the loop and as in the case of FIG. 4, the first slot will immediately follow the header signal which is recognized by all of the terminals. Since each of the terminals knows which slot has been assigned to it for communication, it merely starts counting slots following recognition of the header to identify that slot amongst the slots which is assigned to it for communication.

Figure 2:
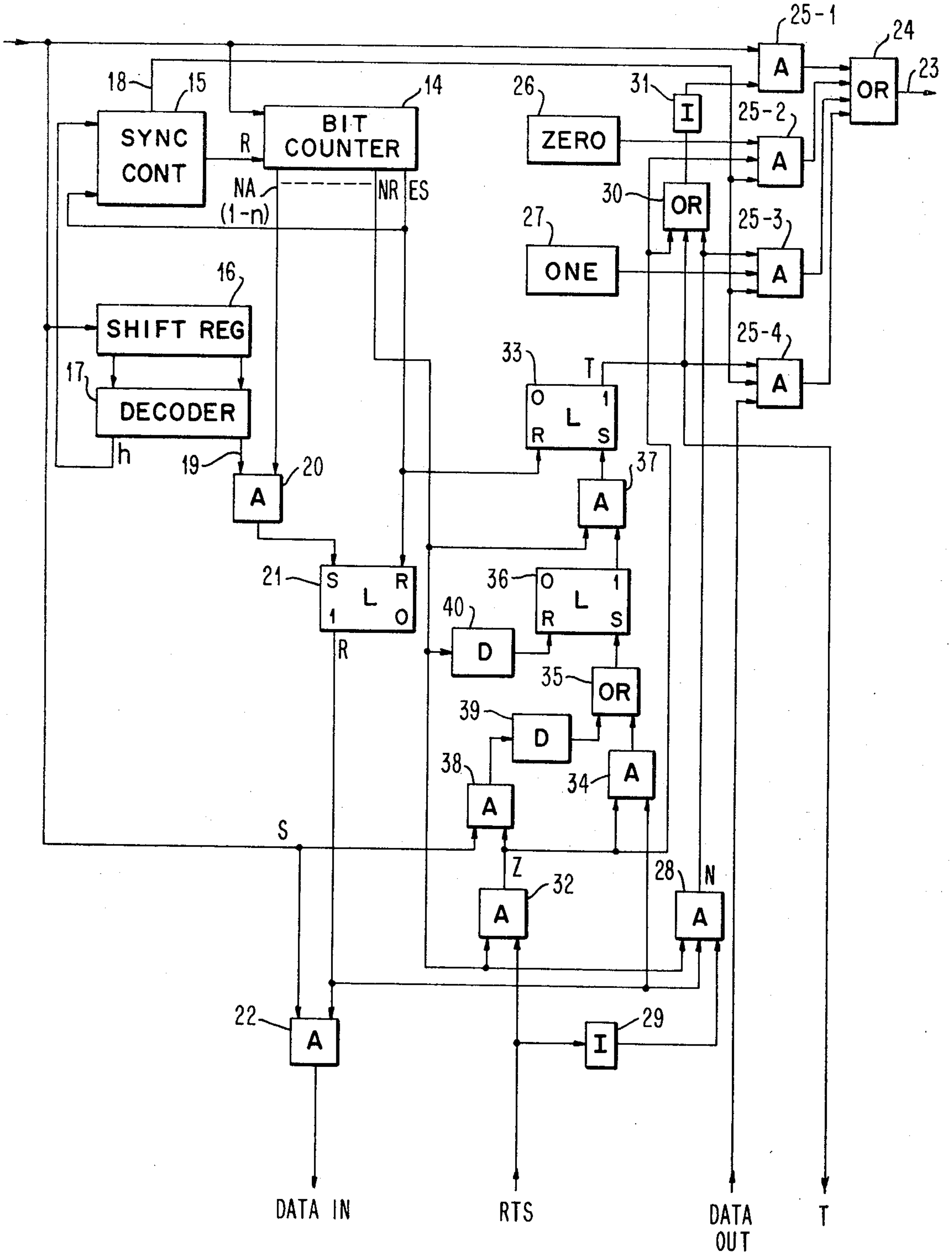
FIG. 2 is a block diagram of a remote control unit for interfacing a terminal to the loop and suitable for use in a system in which time slots are assigned on an as needed basis to a terminal by incorporating within the time slot a unique configuration of signals recognizable only by the terminal which is to receive the data.
Figure 3:
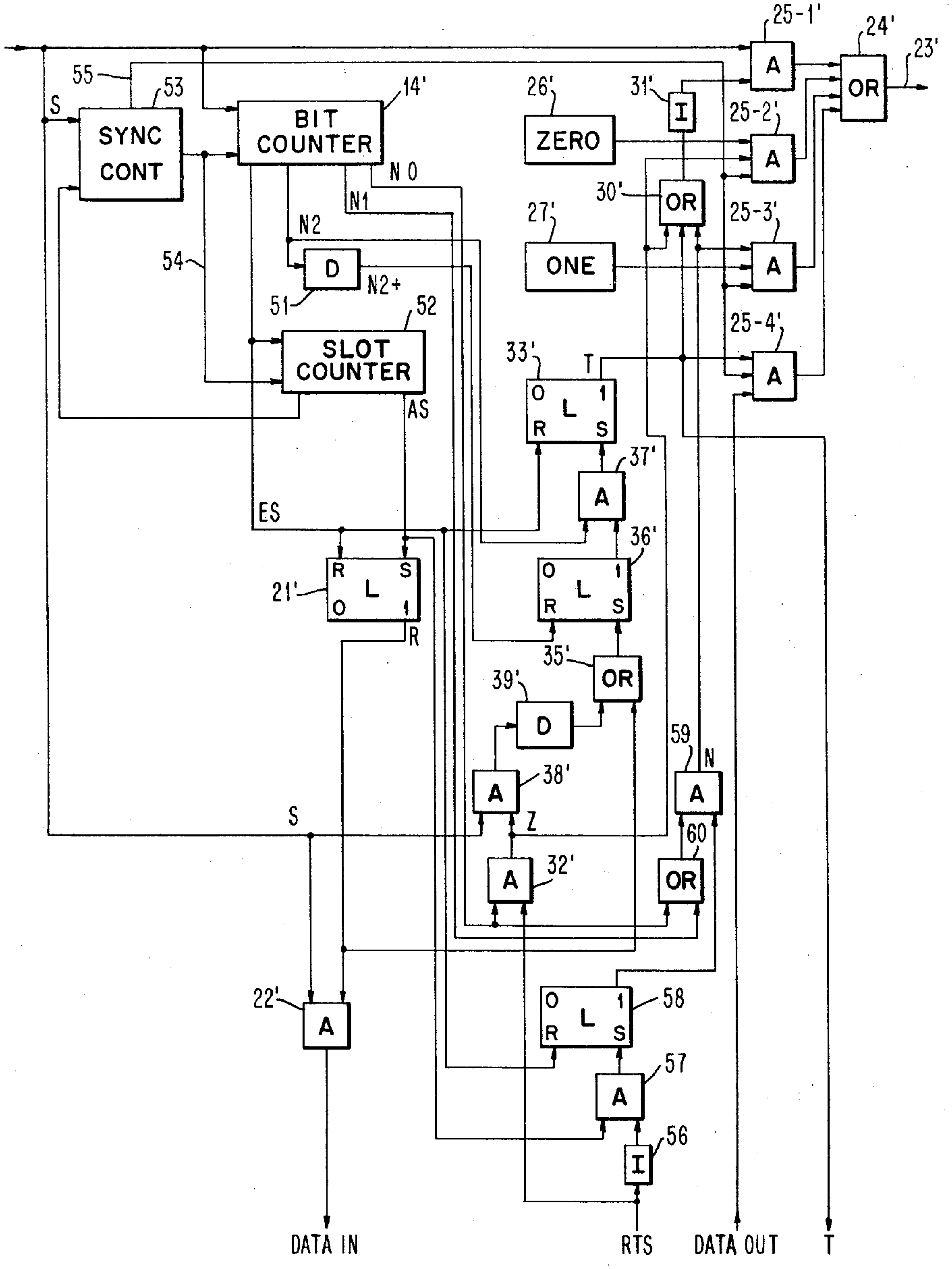
FIG. 3 is a block diagram of a remote control unit for interfacing a terminal to the loop and suitable for use in a system in which each terminal is permanently assigned a time slot for the receipt of data.
Figure 6:
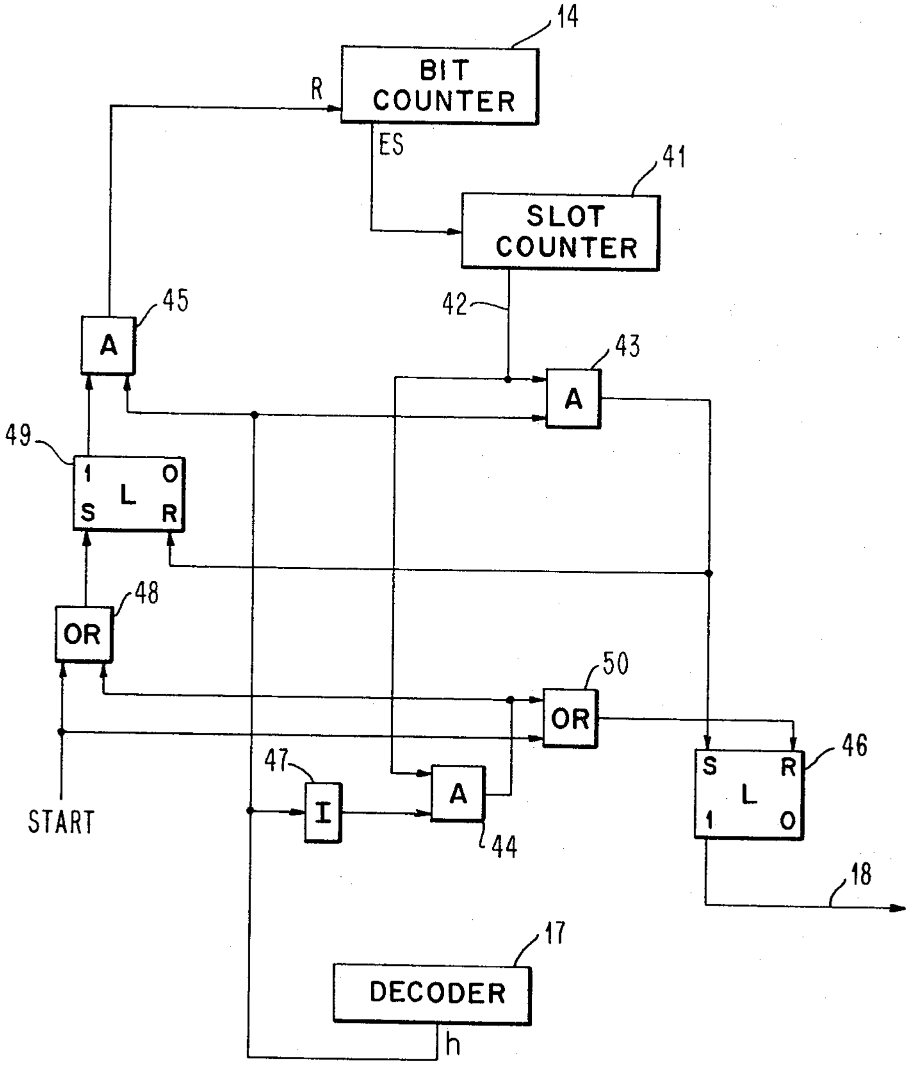
FIG. 6 is a block diagram of a synchronization and control circuit illustrated in FIG. 2.

One of the remote control units 12 illustrated in FIG. 1 is shown in detail in FIG. 2. The control unit includes a bit counter 14 connected to the loop for receiving data bits and incrementing as each of the serial bits is received. The counter is arranged to count cyclically and has a length equal to the number of bits in each of the slots. Counter 14 must be synchronized so that it starts the count for each of the slots at a predetermined point and counts to some maximum value which coincides with the last bit of a given slot and resets back to the predetermined point for the first bit of the next slot. This synchronization is under control of a synchronization control circuit 15 which provides an output connected to the reset input of bit counter 14. The details of synchronization control circuit 15 are illustrated in FIG. 6 and will be described later.

Three outputs from counter 14 are illustrated. These are connected to predetermined stages of the counter 14. The output NA(1–*n*) coincides with the last bit position of the first address field, the output labeled NR coincides with the free busy bit illustrated in FIG. 4, and the output ES coincides with the last bit position of the information field. The three outputs described above will provide signals when the counter resides at the identified stages corresponding to the positions described in the slot format illustrated in FIG. 4.

A shift register 16 having a predetermined length has an input connected to the loop and contains a predetermined number of bits in the order received from the loop. The stages of the shift register 16 are connected in parallel to a decoder circuit 17 which decodes the unique code utilized for the header section. When the decoder detects the unique code identified with the header section, it provides an output on a conductor *h* which is applied to the synchronization control circuit 15. In addition, the output ES from bit counter 14 is also applied to synchronization control circuit 15. From these two inputs, the synchronization control circuit 15 provides a synchronizing pulse to the reset input of the bit counter 14 for causing the bit counter to operate in synchronism with the information on the loop line such that the output identified will occur during the proper positions in the slots as they are serially received from the loop. Synchronization control circuit 15 provides a second output on a conductor 18 which indicates that the bit counter 14 is in synchronism with the data received from the loop. This output is used for enabling the transmission of data and will be described later. Decoder 17 in addition to the output *h* described above provides an additional output on a conductor 19 which occurs whenever the decoder recognizes the unique address assigned to the terminal connected to the remote control unit 12.

Conductor 19 from decoder 17 is connected to one input of an AND circuit 20. The other input of AND circuit 20 is connected to the output NA(1–*n*) from bit counter 14. The output NA(1–*n*) from bit counter 14 enables the AND circuit 20 at the appropriate time to examine the contents of decoder 17. If the decoder 17 detects at that time, the unique address for the terminal within shift register 16, AND gate 20 develops an output which is utilized to set a latch 21. When latch 21 is set, an AND gate 22 connected to the loop is enabled causing the data on the loop to be transmitted via the AND gate 22 to the terminal not shown in FIG. 2. The circuit thus far described provides for the switching of data on the loop to the connected terminal. The remainder of the circuit covers the operation of the bypass gating in which data on the loop is transmitted past the remote control unit, the alteration of the free busy bit, and the gating of data originating at the terminal onto the loop.

The output 23 of a four-input OR circuit 24 is the output for the remote control unit 12. Four AND gates 24–1 through 25–4 have their outputs connected to the four inputs of OR circuit 24. AND gate 25–1 controls the bypassing of signals from the input to the output of the remote control unit. When this AND gate is properly enabled, signals coming in to the remote control unit 12 are passed through AND gate 25–1 and OR gate 24 to the output 23. AND gate 25–2 controls the insertion of a "zero" signal from a "zero" generating source 26. When the AND gate is properly enabled, AND gate 25–3 controls the insertion of a "one" signal from a "one" signal generating source 27 to the output 23 via OR circuit 24 when the AND gate 25–3 is properly enabled. AND gate 25–4 controls the insertion of data from the terminal onto the loop. When AND gate 25–4 is properly enabled, data from the terminal passes through the AND gate 25–4, OR circuit 24 to the output 23 and thence via the loop back to the central station 10. Output conductor 18 from synchronization control circuit 15 is connected to AND gates 25–2, 25–3 and 25–4 and constitutes one of the two enabling inputs for each of the AND gates.

Latch 21 is set upon receipt of the address of the terminal connected to the remote control unit. This is determined by the output NA(1–n) from bit counter 14 via the intervention of AND circuit 20. When this latch is set, an output R is developed. The output R as previously described enables AND gate 22 which switches the inbound data to the terminal. In addition, the output R developed when latch 21 is set is applied to an AND circuit 28. This AND circuit will be enabled if the terminal has no data to transmit. The terminal provides a signal RTS when it has data to transmit. This signal is a request to transmit. If the signal is not provided, an enabling signal is provided by an inverter circuit 29 for AND gate 28 and when the free busy bit, at time NR as determined by the output of counter 14 occurs, the signal N is developed at the output of AND circuit 28 and applied to the input of AND circuit 25–3 which causes a one to be transmitted in place of the zero received. The one transmitted at this time indicates to downstream terminals that the slot on the line at that particular time is free. The output of AND circuit 28 is also applied via an OR circuit 30 and an inverter 31 to AND circuit 25–1. It has no effect on AND circuit 25–1 at this time under the conditions described. However, if all of the inputs to the OR circuit 30 are down via the action of inverter 31, AND circuit 25–1 is enabled and causes data on the loop at the input side of the control unit to bypass the control unit via AND circuit 25–1 and OR circuit 24. AND circuit 25–3 will only be enabled during NR time as determined by bit counter 14 for one bit time only in a given slot and that slot must have been initially addressed to the terminal associated with the control unit 12.

If the terminal has data to transmit, the RTS signal supplied will enable an AND gate 32 and an output Z will be developed at the NR time as determined by bit counter 14. The output Z from AND gate 32 is applied to AND circuit 25–2 and cuases a zero to be transmitted during the free busy bit time NR as determined by bit counter 14. This action retains the slot in the busy state and will permit the terminal to transmit data back to the central while it is receiving data from the central. The Z output from AND gate 32 is applied to the OR circuit 30 and functions in the same manner as the output N from AND circuit 28 described above. The Z output will also be generated during the receipt of any slot when the terminal associated with the control unit has data to transmit. This will force a "zero" to be transmitted during the free busy bit time NR as indicated by bit counter 14. However, except during the case where the terminal is receiving data during a given slot, the slot may already be in the busy state and the terminal would not be changing the data. The remaining circuitry which will be described below determines when the terminal may transmit in a slot in which it is not receiving.

A latch 33 provides a signal T when set which controls AND gate 25–4 which permits the switching of data from the terminal to the line. In addition, the signal T is sent to the terminal to indicate that it may transmit. Latch 33 is set under two conditions, both of which result upon the generation of signal Z from AND gate 32. When a slot addressed to the terminal is being received, the signal T will be generated if the terminal has data to transmit. The signal T will also be generated during any slot when the terminal has data to transmit if the free busy bit during the time NR as determined by bit counter 14 is a "one". Since if the free busy bit is a "one", it indicates that the slot is free and available to send data from the terminal to the central station 10.

An AND gate 34 has one input connected to the R output of latch 21 and the other to the Z output of AND gate 32. The output of AND gate 34 is connected via an OR circuit 35 to the set input of a latch 36. The set output of latch 36 is connected via an AND circuit 37 to the set input of latch 33. The other input of AND gate 37 is connected to the NR output of bit counter 14. Thus, latch 33 will be set during any slot addressed to the terminal connected to the remote control unit 12 if that remote control unit has data to send and signals on the RTS line. The Z signal is generated as previously described and passed via gate 34 since the latch 21 is set. The output of AND gate 34 is applied via OR circuit 35 to set latch 36. The set output of latch 36 enables AND circuit 37 which passes the NR output from bit counter 14 to set the latch 33. When latch 33 is set, the transmit signal T is generated. The transmit signal T is supplied to the terminal to indicate that the terminal may transmit and is also applied to AND circuit 25–4 to cause the data from the terminal to be switched via OR circuit 24 to the output 23.

Latch 33 may be set alternatively during any slot in which the free busy bit is in the free state or "one". The output Z from AND circuit 32 is applied to one input of an AND circuit 38. The signals from the input line of the loop are connected to the other input of AND circuit 38. AND circuit 38 will be enabled any time the input signals are in the "one" condition. Thus, if at the time the Z signal is generated, the incoming signal on the line is in the "one" state, AND gate 38 will develop an output which is applied via a delay circuit 39 and OR circuit 35 to the set input of latch 36. The remaining portions of the circuit work as described above. However, if at the time the Z output of AND circuit 32 is generated, the signal on the line is in the "zero" state, AND circuit 38 will not provide an output for setting latch 36. The "zero" will be generated by the "zero" source 26; however, it will merely replace the "zero" that was received. In addition, the transmit signal T will not be generated since the latch 36 is not set.

The latches 21, 33 and 36 are reset under control of bit counter 14. Latch 21 is reset at ES time; ES being the last bit of the slot. The latch 21 indicates that the terminal is receiving. At the last bit of the receiving slot, the latch 21 is reset by the ES output from the bit counter 14. Latch 36 is reset shortly after the free busy bit is received since it has performed its function at this time. This is effected by connecting the NR output from bit counter 14 via a delay circuit 40 to the reset input of latch 36. Latch 33 is reset under the same conditions that latch 21 is reset and is reset by the ES output of bit counter 14.

The details of synchronization and control circuit 15 are illustrated in FIG. 6. The output ES from bit counter 14 is applied to a slot counter 41 which provides an output 42 coinciding with the position of the header code *h* from decoder 17 when the system is synchronized. The output 42 is applied to a first AND gate 43 and to a second AND gate 44. The output *h* from decoder 17 is applied to one input of AND gate 43 and to one input of another AND gate 45. When the output 42 and h occur simultaneously, AND gate 43 provides an output which is applied to the set input of a latch 46 which indicates that synchronization has occurred. The "one" output from latch 46 is applied via conductor 18 to AND gates 25–2, 25–3 and 25–4 to enable operation of the circuit. The output *h* from decoder 17 and the output 42 from the slot counter 41 will only occur simultaneously when the circuit is synchronized. The output h is applied via an inverter 47 to the other input of AND gate 44. AND gate 44 will provide an output whenever the output 42 is present and *h* is absent, this indicates a lack of synchronism. The output from AND gate 44 is applied via an OR circuit 48 to the set input of a latch 49. The set output of latch 49 is applied to AND circuit 45 and enables the AND circuit 45 when the latch is set; thus, causing an *h* signal to reset the bit counter 14 when the AND circuit 45 is enabled. This permits an attempt at synchronization when the *h* signal is decoded by decoder 17 following a failure to detect synchronism. In addition, when the terminal is started, the start signal or power-on signal is also applied via OR circuit 48 to the set input of latch 49 to cause AND gate 45 to become enabled.

The start or power-on signal is also applied via an OR circuit 50 to the reset input of latch 46; thus, removing the enable signal if for any reason it were present during startup. In addition, the output of AND circuit 44 is also applied via OR circuit 50 to the reset input of latch 46. Thus, as soon as synchronism is lost, latch 46 is reset and operation of the circuit is inhibited until synchronism is detected. With the circuit arrangement shown in FIG. 6, transparency within the code is achievable since signals within data which correspond to the header code will not cause a reset. They may initially cause an attempted reset during startup or immediately following loss of synchronization. However, once synchronization is achieved, header signals contained within data will not cause a reset of bit counter 14. Only a failure of synchronization will cause latch 46 to be reset and latch 49 to be set which would initiate a search for synchronization again.

The remote control unit illustrated in FIG. 3 is suitable for use in those systems in which each of the control units and its associated terminal is provided with an assigned slot for receiving data from the central terminal. Thus, the terminal address information is inherent in the slot position and all the control unit need do is determine the assigned slot by counting slots once the header section has been determined. In FIG. 3, those circuits directly corresponding to the circuits illustrated and described with respect to FIG. 2 bear the same reference numeral with a prime thereover to distinguish them from the circuits of FIG. 2. The priming has been reserved for those circuits which are identical in structure and function to those bearing the same reference numeral without the prime in FIG. 2.

Bit counter 14' receives the incoming bits from the loop and is identical to bit counter 14 of FIG. 2 with the exception of the number of bit positions within a slot counted. The outputs from bit counter 14' of interest are NO, the first bit position which corresponds to the free busy bit, bit N1, the bit position immediately following; bit N2 and bit N2+ derived by a delay circuit 51 connected to the N2 output from bit counter 14' and ES, the last bit of the slot. The ES output from bit counter 14' is connected to a slot counter 52 which is provided with a connection unique to each of the remote control units for generating an output AS corresponding to the assigned slot. The connection is unique since each of the remote control units connected in the loop will have a different assigned slot. Thus, a different connection must be provided for each of the remote control units 12. A synchronization and control circuit 53 is connected to the incoming line and to the slot counter 52 and provides a first output 54 for resetting both the bit counter 14' and the slot counter 52 to achieve synchronization. A second output 55 is utilized for enabling AND circuits 25–2', 25–3' and 25–4'.

The request to transmit RTS from the terminal is applied via an inverter 56 and an AND gate 57 to the set input of a latch 58. The other input to AND gate 57 is connected to the AS output of slot counter 52. Thus, if the terminal does not require service when the assigned slot is detected by slot counter 52, latch 58 is set via the output of AND circuit 57. When latch 58 is set, an AND gate 59 is enabled and the N signal is generated during bit counter output N0 and N1 via an OR circuit 60. The N output operates exactly as its counterpart in FIG. 2 operates. This output when generated, causes a "one" to be inserted via AND circuit 25–3' and OR circuit 24' to thus free the slot. The slot is freed in this instance since the terminal does not require service.

If the terminal requires service, inverter 56 will prevent the setting of latch 58. Latch 58 is reset by the following ES signal from bit counter 14'. The AS output from slot counter 52 is applied to the set input of latch 21' and generates the same R output described above with respect to FIG. 2. The R output from latch 21' performs substantially the same function as performed by the R output from latch 21 of FIG. 2. Latch 21' is also reset by the ES output from bit counter 14' as described above with respect to FIG. 2. The generation of the Z and T signals is substantially identical to that in FIG. 2 described above and the remainder of the circuits illustrated in FIG. 3 operate substantially identical to those bearing the corresponding unprimed reference numerals in FIG. 2.

Figure 7:
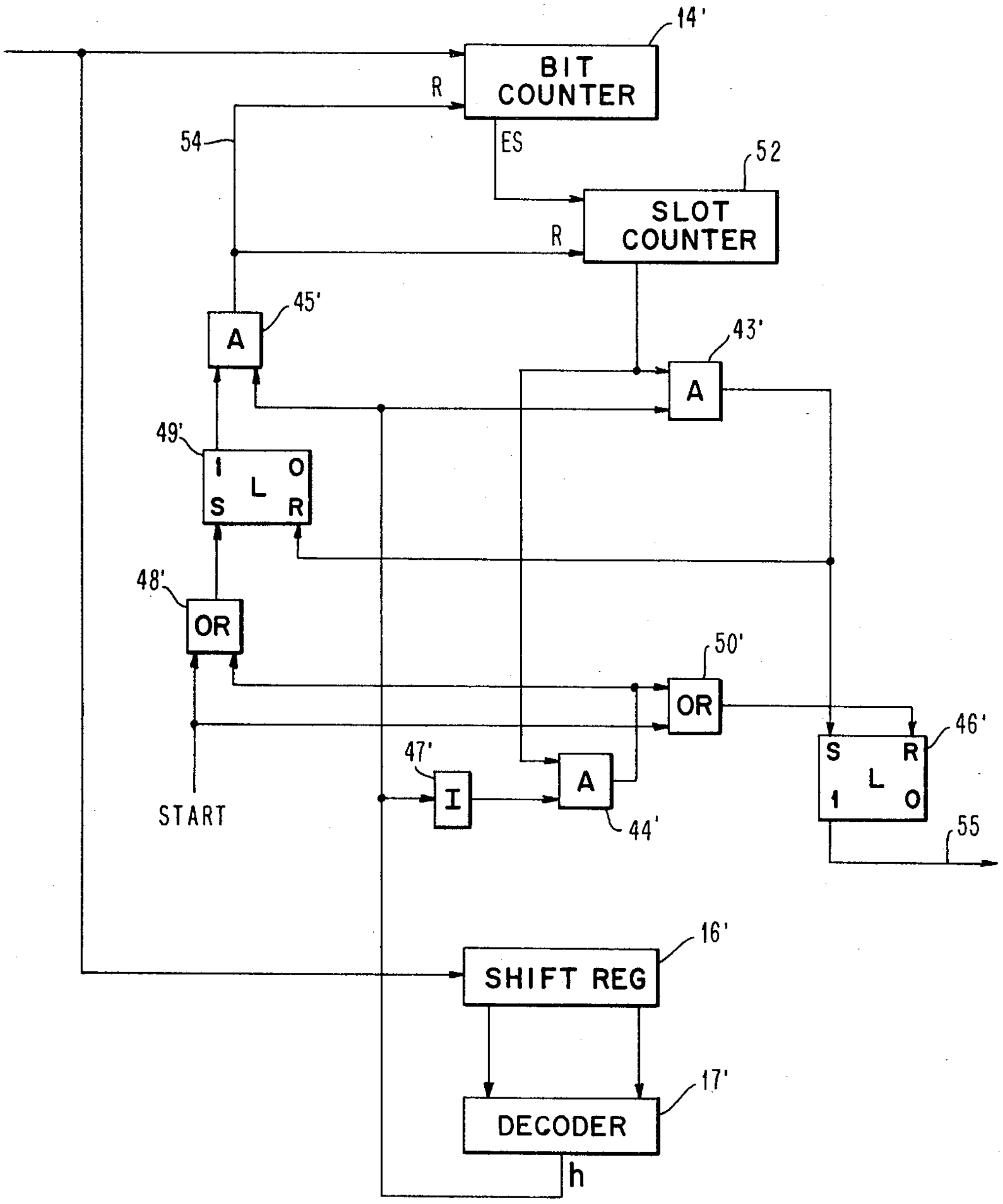
FIG. 7 is a block diagram of a synchronization and control circuit illustrated in FIG. 3.

The details of synchronization and control circuit 53 are illustrated in FIG. 7. Here all of the components have been previously described in connection with the description of FIGS. 2 and 6 and the operation should be obvious from the arrangement of the circuits and the corresponding reference numerals primed utilized in the figure. The shift register 16' and decoder 17' are identical in operation to the shift register 16 and decoder 17, respectively described in FIG. 2. The slot counter 52 is the same slot counter 52 described in FIG. 3. The remaining circuits bear the corresponding reference numerals primed to those in FIG, 6 and operate in exactly the same manner.

While the invention has been particularly shown and described with reference to preferred embodiments thereof, it will be understood by those skilled in the art that various changes in form and details may be made therein without departing from the spirit and scope of the invention.

What is claimed is:

1. A method of operating a serial loop data communications system for the transmission of data between a central station and a plurality of remote terminal units directly connected without delay circuits to the serial loop, each of said terminal units includes a control unit for interfacing the loop and a connected terminal and comprises the steps of:

at said central station;

generating a plurality of time limited data slots for transmitting data to the terminals;

providing for each of said slots; first address information from which the terminals can detect data messages directed to the terminal, status indicia following said first address information for indicating that the slot contains data for an addressed terminal and data to be received by the addressed terminal;

at each of said remote terminals examining said incoming data on the loop to;

detect first address information associated with the terminal and accept data from slots addressed to the terminal;

altering the status indicia of slots addressed to the terminal to indicate that the slot contains no data for the addressed terminal if the addressed terminal has no data to transmit to the central station at the time of receipt of the addressed slot; and altering the status indicia of any slot from the state which indicates that the slot contains no data for the addressed terminal to the state which indicates that the slot contains data, if the terminal has data to transmit, inserting the terminal address and the data to be transmitted in the slot following the altered status indicia.

2. A method of operating a serial loop data communications system as set forth in claim 1 in which said first address information includes a unique combination of digital signals identifying any one of the connected terminals, said status indicia is a digital signal having two states and indicating that the slot contains data for an addressed terminal when in one state and that the slot contains no data for the addressed terminal when in the other state, and said data includes a coded combination of digital signals for conveying data to the addressed terminal.

3. A method of operating a serial loop data communications system as set forth in claim 1 in which said first address information includes a unique combination of digital signals identifying the beginning of the series of slots at least one of which is exclusively assigned to each of the connected terminals, said status indicia is an digital signal within the slot having two states and indicating when in one state that the slot contains data for the addressed assigned terminal and indicating when in the other state that that slot contains no data for the addressed assigned terminal, and said data includes a coded combination of digital signals for conveying data to the addressed assigned terminal.

4. A serial loop data communications system for the transmission of data between a central station and a plurality of remote terminal units each directly connected without delay circuits to the serial loop, each of said terminal units includes a control unit for interfacing the loop and a connected terminal and comprises:

a central station for receiving and transmitting data messages to terminal units via time limited data slots each of which is selectively provided with a unique combination of address signals identifying any one of the connected terminal units, a status signal having at least two states for indicating in one state that the slot is in use and in another state that the slot is not in use and is available, and coded data signals for conveying data to the addressed terminal unit;

a plurality of remote terminal units connected to the serial loop for receiving data from and transmitting data to the central station;

each of said remote terminal units including;

first means indicating receipt of a terminal unit address unique to the receiving terminal unit, second means responsive to said first means for receiving the signals from a slot including the unique terminal address, third means responsive to the first means for altering the status signal is a slot including the unique terminal address from the said one state to the said other state if the addressed terminal unit has no data to transmit, fourth means responsive to a received status signal for altering a said received status signal which is in its said other state to its said one state and transmitting signals including address and data in the slot associated with the altered status signal, and fifth means responsive to the said third and fourth means for passing on received signals unaltered when the terminal unit is not generating signals for transmission on the loop.

5. A serial loop data communications system for the transmission of data between a central station and a plurality of remote terminal units each directly connected without delay circuits to the serial loop, each of said terminal units includes a control unit for interfacing the loop and a connected terminal and comprises:

a central station for receiving and transmitting data messages to terminal units via a plurality of time limited data slots at least one for each of said plurality of terminals, said slots being preceded by a combination of electric digital signals identifying the beginning of the plurality of slots and each of said slots including a status signal having at least two states for indicating in one state that the slot is in use and in another state that the slot is not in use and is available for any terminal to transmit data via the slot to the central station, and coded data signals for conveying data;

a plurality of remote terminal units connected to the serial loop for receiving data from the transmitting data to the central station; each of said remote terminal units including;

first means for indicating receipt of the slot assigned to the terminal unit for the receipt of messages from the central station, second means responsive to said first means for receiving signals from the indicated slot, third means responsive to the first means for altering the status signal in the assigned slot from the said one state to the said other state if the terminal assigned to the slot has no data to transmit, fourth means responsive to a received status signal for altering a said received status signal which is in its said other state to its said one state and transmitting signals including the unique address of the terminal unit and data within the slot associated with the altered status signal, and fifth means responsive to the said third and fourth means for passing on the received signal unaltered when the terminal unit is not generating signals for transmission onto the loop.

* * * * *